US010532384B2

(12) United States Patent
Miller et al.

(10) Patent No.: US 10,532,384 B2
(45) Date of Patent: Jan. 14, 2020

(54) SHUTDOWN SYSTEM FOR METAL-AIR BATTERIES AND METHODS OF USE THEREOF

(71) Applicant: PHINERGY LTD., Lod (IL)

(72) Inventors: Yisrael Miller, Bat Ayin (IL); Ilya Yakupov, Rehovot (IL); Avraham Yadgar, Kiryat Ono (IL)

(73) Assignee: Phinergy Ltd., Lod (IL)

( * ) Notice: Subject to any disclaimer, the term of this patent is extended or adjusted under 35 U.S.C. 154(b) by 370 days.

(21) Appl. No.: 15/516,926

(22) PCT Filed: Oct. 7, 2015

(86) PCT No.: PCT/IL2015/050999
§ 371 (c)(1),
(2) Date: Apr. 5, 2017

(87) PCT Pub. No.: WO2016/056006
PCT Pub. Date: Apr. 14, 2016

(65) Prior Publication Data

US 2017/0309981 A1 Oct. 26, 2017

Related U.S. Application Data

(60) Provisional application No. 62/060,706, filed on Oct. 7, 2014.

(51) Int. Cl.

| | |
|---|---|
| ***B08B 3/08*** | (2006.01) |
| ***H01M 4/38*** | (2006.01) |
| ***H01M 12/08*** | (2006.01) |
| ***B08B 3/02*** | (2006.01) |

(52) U.S. Cl.
CPC .................. *B08B 3/08* (2013.01); *B08B 3/02* (2013.01); *H01M 4/38* (2013.01); *H01M 12/08* (2013.01); *H01M 2220/20* (2013.01); *H01M 2300/0014* (2013.01)

(58) Field of Classification Search
None
See application file for complete search history.

(56) References Cited

U.S. PATENT DOCUMENTS

| | | | |
|---|---|---|---|
| 3,847,671 | A | 11/1974 | Leparulo et al. |
| 5,011,747 | A | 4/1991 | Strong et al. |
| 5,093,213 | A | 3/1992 | O'Callaghan |
| 5,615,717 | A | 4/1997 | Cheiky |

(Continued)

FOREIGN PATENT DOCUMENTS

| | | | |
|---|---|---|---|
| DE | 102013200792 | | 7/2014 |
| GB | 1456736 | | 11/1976 |
| JP | 2003123755 | A | 4/2003 |

(Continued)

*Primary Examiner* — Mikhail Kornakov
*Assistant Examiner* — Ryan L. Coleman
(74) *Attorney, Agent, or Firm* — Pearl Cohen Zedek Latzer Baratz LLP

(57) ABSTRACT

This invention provides systems and methods for treating electrodes used in batteries and electrochemical cells upon battery/cell shutdown and prior to battery standby mode. Systems and methods of this invention are directed toward the use of aerosol to treat the electrode and to protect the electrode and/or the environment from undesired reactions.

33 Claims, 4 Drawing Sheets

(56) References Cited

U.S. PATENT DOCUMENTS

| | | | | |
|---|---|---|---|---|
| 2009/0020135 | A1* | 1/2009 | Adams | A61L 2/0011 134/1 |
| 2015/0171494 | A1* | 6/2015 | Tzidon | H01M 6/5072 429/406 |

FOREIGN PATENT DOCUMENTS

| | | |
|---|---|---|
| WO | WO 01/33659 | 5/2001 |
| WO | WO 2013/150520 | 10/2013 |

* cited by examiner

SHUTDOWN SYSTEM FOR METAL-AIR BATTERIES AND METHODS OF USE THEREOF

CROSS-REFERENCE TO RELATED APPLICATIONS

This application is a National Phase Application of PCT International Application No. PCT/IL2015/050999, International Filing Date Oct. 7, 2015, entitled "A Shutdown System for Metal-Air Batteries and Methods of use Thereof", published as WO 2016/056006 claiming priority of U.S. Provisional Application No. 62/060,706, filed Oct. 7, 2014, which are hereby incorporated by reference.

FIELD OF THE INVENTION

This invention provides battery shutdown systems and a battery shut down methods. The systems and methods utilize a spray (such as an aerosol spray) for treating electrode(s) of a battery.

BACKGROUND OF THE INVENTION

Metal-air batteries are very attractive power sources in light of their potential high energy density. In this type of cells the oxidizing reactant (oxygen) which undergoes reduction during discharge is supplied from outside the battery. This reaction of oxygen reduction occurs in the presence of water and gives hydroxide ions (OH). The electrolyte generally used in such batteries is an alkaline electrolyte, i.e. an aqueous solution of a basic pH. The anode in metal-air batteries may undergo chemical reactions with the alkaline electrolyte as will be exemplified below for a metal-air cell comprising an aluminum anode.

Aluminum air battery is a metal air battery where the anode comprises aluminum. Aluminum is a lightweight metal, which produces three electrons per atom at oxidation. The electrochemical capacity of aluminum is 2.98 Ah/g, which is comparable to that of lithium (3.86 Ah/g). Moreover, flat aluminum anodes are not readily flammable in air atmosphere and are relatively non-expensive.

The use of aluminum as an anode, in combination with an air cathode, and a circulating highly-conductive aqueous alkali electrolyte provides a very attractive battery performance, regarding energy, power density and safety.

At normal aluminum-air battery operation conditions, aluminum dissolution in alkali electrolyte is electrochemical, according to the following reaction:

$$4Al+3O_2+6H_2O \rightarrow 4Al(OH)_3 \qquad \text{(reaction 1)}$$

However, in parallel to this beneficial reaction, portions of the aluminum at contact with the alkaline electrolyte undergoes the undesirable direct chemical dissolution:

$$2Al+6H_2O+2KOH \rightarrow 2K[Al(OH)_4]+3H_2\uparrow \qquad \text{(reaction 2)}$$

The ratio between the rate of the beneficial electrochemical reaction 1 to the total rate of aluminum dissolution (Reaction 1 and 2 together) produces the actual aluminum utilization efficiency coefficient [e], which is one of the major parameters characterizing the performance of an Al-air battery:

$$e = \frac{R1}{R1 + R2}$$

By balancing the operation parameters, such as the current density and the working temperature, and by application of certain additives, the efficiency of aluminum conversion (c) to electricity can be kept well above 90% (sometimes close to 100%).

A substantial practical obstacle for widespread implementation of Al-air batteries in practical applications such as electric vehicles, results from the requirement for such a battery to be shutdown at any moment, to be safe at standby for any period of time, and to be ready for quick restart to the full power at any moment. The main problem with those requirements is the susceptibility of aluminum to a very intensive corrosion in alkaline electrolyte. A major negative outcome of this process is that products of this process, (metal oxides/hydroxides) form a deposit layer on the anode surface. This layer passivates the anode and affects normal anode operation at the next battery operation cycle.

This process results in consumption of the aluminum anode material without generation of external electrical energy. It also results in unwanted, extensive hydrogen evolution (reaction 2), and in electrolyte degradation. Hydrogen evolution from aluminum corrosion (aluminum oxidation) in alkali solutions adds an additional safety problem to the battery halting issue.

The most straightforward way to avoid aluminum-electrolyte reaction (reaction 2) when electric load is not applied (at temporary stop or at shutdown for prolonged time) is to prevent physical contact between the aluminum electrodes and the electrolyte.

Therefore, the obligatory condition when stopping the battery is to take the electrolyte out of the cell. In the case of Al-air battery with recycling electrolyte this operation can be easily performed by re-directing (e.g. pumping) the electrolyte flow back into an electrolyte storage tank for complete battery emptying.

However, even the most thorough emptying of electrolyte from a battery (whether it is free-flow gravitational or forced by a pump) leaves some amount of electrolyte in the battery. Residual electrolyte in the battery can be found as a film on the aluminum surface. It can also be found on the cell walls, or as a liquid soaked in the porous air electrode body and entrapped in poorly-drainable corners.

Electrolyte residue that is located in direct contact with the anode will continue to react with aluminum (according to reaction 2), causing aluminum oxidation and decomposition of water from the alkaline electrolyte, and formation of a layer of aluminum hydroxide (and/or other products) on the anode surface. Moreover, after most of the water of the residual electrolyte film on the anode is consumed, the corrosion reaction does not stop. The reaction of surface film formation, can continue to a rather high extent due to three factors:

1. reaction continues because the aluminum hydroxide layer which is formed on the anode surface, is not dense, and does not prevent the reaction progress (corrosion continuation deeper into the aluminum metal body);

2. even after electrolyte at direct contact with the anode surface is consumed-reaction continues because new portions of residual electrolyte in the battery are attracted to aluminum, by capillary forces and as a result of the good wetting properties of the concentrated alkali solution.

3. water consumption by the corrosion process causes an increased local alkali concentration in the electrolyte film on the anode surface. Highly concentrated alkali solution is hygroscopic, and effectively absorbs the moisture from the ambient air. Such moisture ingress in the battery sustains further corrosion of the anode.

Unavoidable reaction of aluminum anodes with electrolyte residue entrapped in the battery is extremely damaging. First because of inert surface film formation of aluminum hydroxide on the surface of the anodes. This passivation layer results in problematic battery restart after a shutdown/standby cycle. Second, the electrolyte and reaction products can dry out thus blocking (clogging) the hydraulic system. In this case a restart of the battery will be very difficult if possible at all.

Thus, electrolyte pumping-out may not be enough to provide effective battery stop and conservation for dry long term standby without electrolyte. Currently, very careful water rinsing of the electrodes and of the system is needed in order not to leave any noticeable residual electrolyte and/or reaction product inside the system.

In order to reach this goal, i.e. to wash out all the residual electrolyte and reaction products, plenty of reserve water should be included in the battery system, thus increasing system weight and volume. This affects gravimetric and volumetric energy density of the system.

There were few attempts to solve the problem of aluminum-air battery shutdown and restart. One is described in WO 01/33659 for small single static cell Al-Air battery with a replaceable cartridge containing anode and electrolyte. In this system the shut-down-run modes of operation were carried out by emptying and then replacing the electrolyte bag. However WO 01/33659 does not disclose cleaning the cell from residual products and electrolyte. WO 2013/150520 discloses a battery shut down system wherein washing solution is used to wash and/or neutralize the electrode at shut-down. However, this method may involve substantial amounts of washing solution.

SUMMARY OF THE INVENTION

In one embodiment, this invention provides systems and methods for treating an electrode of a metal-air battery at shutdown or at a standby mode. In one embodiment, systems and methods of this invention prevent, reduce or eliminate the degradation of the electrode during shutdown/standby mode. In one embodiment, systems and methods of this invention assist in stabilizing the electrode. In one embodiment, treatment systems and methods of the invention improve the life time and the performance of the electrode. In one embodiment, systems and methods of this invention prevent, reduce or eliminate environmental hazards resulting from unwanted reactions of the electrode at a standby/shutdown mode.

In one embodiment, this invention provides a system for treating an electrode of a metal-air battery at shutdown/standby mode, the system comprising:

a battery comprising a metal anode;
a liquid treatment tank; and
a spray generation element, wherein said liquid treatment tank is connected to said battery through a connector.

In one embodiment the spray generation element is in contact with said liquid treatment tank.

In one embodiment, said spray generation element is in contact with said battery.

In one embodiment, the spray generation element comprises a nozzle. In one embodiment, the spray generation element comprises the connector. In one embodiment, the connector comprises the spray generation element.

In one embodiment, this invention provides a system for treating an electrode of a metal-air battery at shutdown/standby mode, the system comprising:

a battery comprising a metal anode;
a liquid treatment tank;
a spray generation element, and
a spray propulsion system;

wherein said liquid treatment tank is connected to said battery through a connector and wherein said spray generator element is in contact with said liquid treatment tank.

In one embodiment, this invention provides a system for treating an electrode of a metal-air battery at shutdown/standby mode, the system comprising:

a battery comprising a metal anode;
a liquid treatment tank;
an aerosol generation element, and
an aerosol propulsion system;

wherein said liquid treatment tank is connected to said battery through a connector and wherein said aerosol generator element is in contact with said liquid treatment tank.

In one embodiment, the liquid treatment tank comprises an acidic liquid. In one embodiment, the acidic liquid is a pure acid, or acid aqueous solution, or a combination thereof.

In one embodiment, the liquid treatment tank further comprises a propellant gas. In one embodiment, propellant gas is used for generating an aerosol from the acid in the liquid treatment tank. In one embodiment, the gas is used for transport of acidic liquid material contained in the liquid treatment tank into the battery in the form of aerosol. In one embodiment the propellant gas comprises air, oxygen, nitrogen, $CO_2$, Ar, Ne, He or a combination thereof. In one embodiment an air compressor or blower is used as a source of propellant gas.

In one embodiment, the electrode is an alkaline metal-air battery electrode. In one embodiment, the electrode is a metal electrode. In one embodiment, the electrode is aluminum, magnesium, lithium or zinc metal electrode, or metal electrode based on alloys of aluminum, magnesium, lithium or zinc with different co-alloying metals (examples are, but not limited by: Sn, Ga, In, Li).

In one embodiment, the battery comprise liquid electrolyte during battery operation, and said electrolyte is placed at least partially within the battery (between the electrodes) during battery operation.

In one embodiment, upon shutdown/standby, liquid electrolyte is drained or pumped out from said battery, and an aerosol is introduced into the battery using the aerosol propulsion system. In one embodiment, the aerosol propulsion system transports aerosol to and into the battery.

In one embodiment, the aerosol is generated using liquid from the liquid treatment tank (e.g. acidic aqueous solution) and using a propellant gas. According to this aspect and in one embodiment, aerosol is formed from liquid and propellant gas using the aerosol generation element. Then the flow of the propellant gas transports the formed aerosol from the liquid treatment tank to the battery.

In one embodiment, the propellant gas used to form the aerosol is initially present in the liquid treatment tank. In another embodiment, the propellant gas source is external to the liquid treatment tank. For example, in one embodiment aerosol is formed from liquid in the liquid treatment tank comprising acid and from a propellant gas present in the liquid treatment tank.

The aerosol is prepared using the propulsion element/system. According to this aspect and in one embodiment, the liquid treatment tank is a pressurized cylinder. The pressurized cylinder comprises acidic liquid and a propellant gas. Upon opening of the cylinder, aerosol is formed and is directed out of the cylinder. In one embodiment, the spray generation element (or the aerosol generation element) comprises a nozzle. In one embodiment, the nozzle facilitates dispersion of liquid into a spray. In one embodiment, a spray is a dynamic collection of drops dispersed in a gas. In one embodiment, the nozzle enables spraying the electrodes and the inner parts of the battery. In one embodiment, spraying means application of droplets to the electrodes and to the inner parts of the battery. In one embodiment, the collection of droplets emerging from the nozzle, showers the electrodes and the inner parts of the battery. In one embodiment, the nozzle enables the formation of a spray.

In one embodiment, this invention provides battery shutdown systems and a battery shut down methods. The systems and methods utilize a spray for treating electrode(s) of a battery. In one embodiment, the spray is an aerosol spray. In another embodiment, the spray is a non-aerosol spray. In one embodiment, an aerosol comprises liquid droplets smaller than the droplets in a non-aerosol spray. In one embodiment, aerosol spray and non-aerosol spray refer to the formation and transport of the spray. According to this aspect and in one embodiment, an aerosol is a suspension of fine liquid particles in a gas. In one embodiment, the aerosol is kept in a container under pressure and a nozzle (a release valve) is used to emit the aerosol into the air in a mist propelled by the gas. In one embodiment, non-aerosol spray is kept as a liquid. A nozzle is used to emit the liquid in small droplets. The shape of the nozzle will dictate the shape of the emerging spray in one embodiment.

Embodiments of the invention described herein for an aerosol spray are applicable to non-aerosol spray as well.

In one embodiment, one or more nozzles are used to generate a spray for treating the electrodes. In one embodiment, two or more nozzles are operated at the same time in order to efficiently spray the electrodes with droplets of the treatment liquid.

In one embodiment, nozzles of this invention are of any type used and known in the art. Aerosol nozzles and/or non-aerosol nozzles are used in embodiments of this invention.

In one embodiment, the liquid comprises the acid is placed in the liquid treatment tank and the propellant gas source is air. The air used as a propellant gas can be present in the liquid treatment tank, external to the liquid treatment tank or at a combination thereof. In one embodiment, the aerosol generation element combines the acidic liquid and the propellant gas to form an aerosol inside the liquid treatment tank, outside the liquid treatment tank, at an opening/outlet of the liquid treatment tank, or a combination thereof.

The battery shutdown system of this invention comprises an aerosol propulsion system, which is a mean(s) of transport of aerosol, generated in the proximity of the aerosol generation element, to and into the cell(s) (the battery). In one embodiment aerosol propulsion is implemented by means of the propellant gas flow, organized in such a way that propellant gas passes nearby the aerosol generation element, through the space where the aerosol cloud is generated, and then the flow is directed into the cell(s) (battery), previously emptied of electrolyte, allowing the aerosol droplets to deposit randomly on the inner surfaces of the battery, including the working surfaces of the electrodes. In another embodiment the propellant gas passes through the aerosol generation element itself (such as pneumatic atomizing nozzle), thus participating in the both formation of the aerosol cloud, and its transport to and into the battery. The source of the propellant gas may be (not limited to) a pressurized cylinder, blower, compressor, ventilator (from the side of the battery inlet), or any means of gas suction from the battery outlet. In one embodiment, the aerosol propulsion system comprises a pressurized cylinder, blower, compressor, ventilator (from the side of the battery inlet), or any means of gas suction from the battery outlet.

In one embodiment, this invention provides an electric vehicle comprising a system which comprises a battery comprising an electrode, wherein the system of this invention is for treating an electrode as described herein, wherein energy from the battery is used to propel the vehicle, and wherein the system is activated upon battery shutdown/standby mode.

In one embodiment, this invention provides a method for treating an electrode operated in liquid electrolyte at a shutdown/standby mode, the method comprises:

separating the electrode from the bulk of the liquid electrolyte; and bringing the electrode(s) into contact with an aerosol.

In one embodiment, the aerosol reacts with liquid electrolyte residue on and within the electrode. In one embodiment, the reaction decreases the pH of the electrolyte residue such that it does not further react with the electrode.

In one embodiment, the electrode is an anode and the liquid electrolyte is an alkaline liquid electrolyte. In one embodiment, the anode is a metal anode. In one embodiment, the aerosol comprises liquid droplets and a gas propellant. In one embodiment, the aerosol liquid droplets are acidic in terms of pH.

In one embodiment, the aerosol is formed by aerosol generation element. In one embodiment, the aerosol generation element comprises an ultrasonic wave generator. The aerosol cloud formed by ultrasonic generator is taken by the flow of propellant gas into the battery. In another embodiment the pneumatic atomizing nozzle activated by compressed propellant gas is used for aerosol formation/generation and transport.

In one embodiment, the liquid used to form the droplets of the aerosol is contained in a liquid treatment tank. In one embodiment, prior to the separating step, the liquid electrolyte is contained in the cell(s) of the battery and at least a portion of the electrode is immersed in the liquid electrolyte. In one embodiment, the separating step comprises draining or pumping the bulk of the liquid electrolyte from the cell into a liquid electrolyte tank.

In one embodiment, the step of bringing the electrode into contact with the aerosol comprises the spraying the aerosol into said cell(s), or flow of aerosol through the battery, whereas the aerosol droplets randomly deposit on the electrode(s) surface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
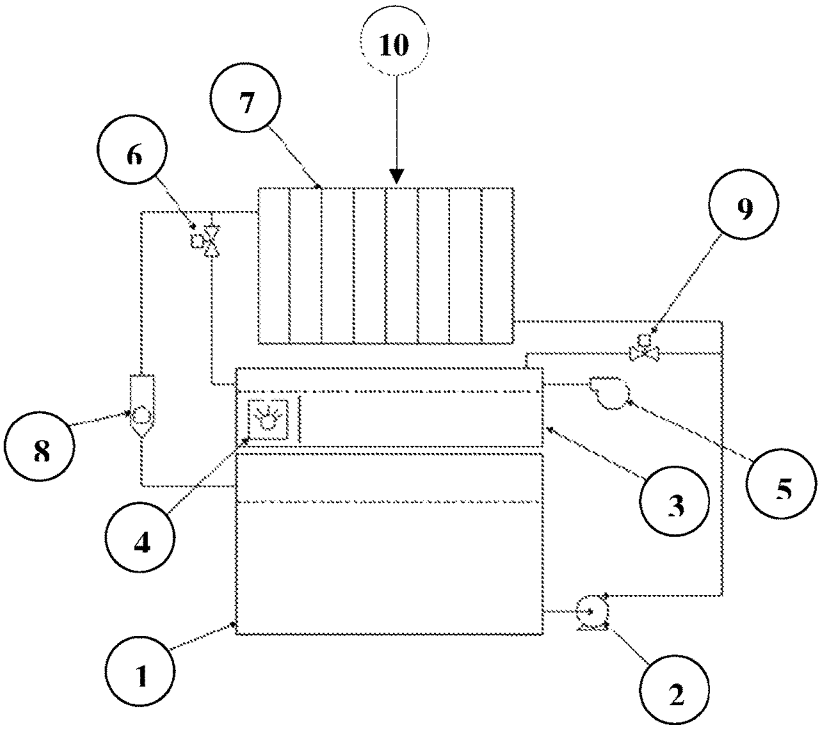
FIG. 1 is a schematic of a metal-air battery with an aerosol shutdown/standby system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, a system for preserving the electrode of an alkaline metal-air battery in a standby or shutdown mode is disclosed. In one embodiment, the electrode is the anode of the cell. In one embodiment, the electrode is a zinc electrode. In one embodiment, the electrode is a magnesium electrode. In another embodiment, the electrode is an aluminum electrode. In one embodiment, the system provides a solution for the problem of electrode chemical degradation caused by the electrolyte at a standby or at shutdown mode (e.g. when the battery is not operated).

The absence of robust solution for maintaining a metal-air battery (e.g. an aluminum battery) and its electrodes at a shutdown or a standby mode was one of the reasons that prevented practical application of this high-energy density power source.

In one embodiment, this invention provides a practical alternative to the need of battery washing with plenty of water/solution, and the need to dispose a large amount of alkaline waste, at each shutdown cycle. In one embodiment, the invention provides a practical solution for an alkaline metal-air battery electrode that is used for propelling an electric vehicle, where the battery is shutdown or is in standby mode.

This invention provides a shutdown/standby system including an electrode treatment element(s) wherein an aerosol is used to treat the electrode at shutdown, thus effectively halting the chemical reaction of electrode with electrolyte, and preventing the accumulation of the reaction products on the surface of the electrode (passivation layer formation). In one embodiment, the droplets in the aerosol comprise a liquid acid solution. In one embodiment, the liquid droplets in the aerosol comprise an acidic solution. In one embodiment, the acidic solution is an aqueous acidic solution.

In one embodiment, this invention provides a system for treating an electrode of a metal-air battery at shutdown/standby mode, the system comprising:

a battery comprising a metal anode;

a liquid treatment tank; and a spray generation element, wherein said liquid treatment tank is connected to said battery through a connector.

In one embodiment the spray generation element is in contact with said liquid treatment tank.

In one embodiment, said spray generation element is in contact with said battery.

In one embodiment, the spray generation element comprises a nozzle. In one embodiment, the spray generation element comprises the connector. In one embodiment, the connector comprises the spray generation element.

In one embodiment, this invention provides a system for treating an electrode of a metal-air battery at shutdown/standby mode, the system comprising:

a battery comprising a metal anode;

a liquid treatment tank;

a spray generation element, and a spray propulsion system;

wherein said liquid treatment tank is connected to said battery through a connector and wherein said spray generator element is in contact with said liquid treatment tank.

In one embodiment, this invention provides a system for treating an electrode of a metal-air battery at shutdown/standby mode, the system comprising:

a battery comprising a metal anode;

a liquid treatment tank;

an aerosol generation element, and an aerosol propulsion system;

In one embodiment, the battery comprises cell or cells. In one embodiment, the battery is a battery of cells. In one embodiment, the liquid treatment tank and the aerosol generation element are placed at a proximity to the battery. In one embodiment, the battery and the liquid treatment tank are connected by a connector. In one embodiment the connector comprises a valve. In one embodiment the valve is automatically controlled. In one embodiment, upon shutdown, the valve is opened thus extracting aerosol out of the liquid treatment tank. In one embodiment, the liquid treatment tank comprises an acid. In one embodiment, the acid is in the form of a liquid, or aqueous solution, or a combination thereof.

In one embodiment, the system further comprises an electrolyte storage container (an electrolyte storage tank). According to this aspect and in one embodiment, the cell(s) of the battery and the electrolyte storage tank are connected. Upon shutdown/standby, electrolyte is drained from the cells into the electrolyte storage tank. Prior to operation of the cells, electrolyte is filled into the cells from the electrolyte storage tank. Other elements such as hoses, connectors, open/close valves, pumps and gauges are included in the system to enable the passage of electrolyte from the electrolyte storage tank to the cells and vice versa in one embodiment.

In one embodiment, in addition to the liquid treatment tank from which aerosol is generated and transferred to the cells, an additional aerosol waste tank is optionally used. According to this aspect and in one embodiment, the aerosol waste tank is connected to the battery. The “aerosol waste” coming out of the battery may contain (preferably) no acid droplets, but rather may contain the droplets of residual electrolyte and other contaminants. Accordingly, directing the aerosol waste to an aerosol waste tank, rather than directing it back to the treatment tank, keeps the liquid treatment tank unchanged in terms of pH and clean in terms of chemical contaminants. In another embodiment, the "aerosol waste" does contain acid droplets.

In one embodiment, the acid comprising an inorganic acid. In one embodiment, the inorganic acid comprises nitric, hydrochloric, hydrobromic, phosphoric, sulfuric, boric, hexafluorophosphoric acid or combination thereof. In one embodiment, the acid comprising an organic acid. In one embodiment, the organic acid comprises formic, acetic, propionic, citric, oxalic, adipic, sebacic, toluenesulfonic, gluconic, ascorbic, tartaric acid or combination thereof.

In one embodiment, the acid comprising a salt of strong acid with weak base. In one embodiment, the salt comprising calcium or barium salt of nitric or sulfuric acids. In one embodiment, the acid functions as a neutralizing agent. In one embodiment, the aerosol comprises an organic and an inorganic acid. In one embodiment, the aerosol comprises an organic acid. In one embodiment, the aerosol comprises an inorganic acid.

In one embodiment, the liquid treatment tank further comprises a propellant gas. In one embodiment, propellant gas is used for generating an aerosol from the liquid in the liquid treatment tank. In one embodiment, propellant gas is used as a propellant for a liquid material contained in the liquid treatment tank. In one embodiment, the gas comprises air, oxygen, nitrogen, $CO_2$, Ar, Ne, He or a combination thereof.

In one embodiment, the electrode is an alkaline metal-air battery electrode. In one embodiment, the electrode is a zinc, magnesium, lithium or an aluminum electrode, or alloys thereof.

In one embodiment, the battery cell(s) comprising liquid electrolyte such that the electrode is placed at least partially within the liquid electrolyte. In one embodiment, the aerosol generation element is connected to the liquid treatment tank.

In one embodiment, the connection between the cell(s) and the liquid treatment tank comprises a hose, a tube, a pipe, a connector, a pump, a piston, a motor, a syringe or a combination thereof. In one embodiment, upon shutdown/standby, liquid electrolyte is drained from said cell(s) and an aerosol is introduced into the cell(s) using the aerosol propulsion element. In one embodiment, aerosol is generated by the aerosol propulsion element using liquid from the liquid treatment tank.

In one embodiment, the proposed battery shutdown/standby system includes an electrolyte storage tank(s), a liquid treatment tank(s), valves and pumps that enable electrolyte removal from the cell(s) of the battery to the electrolyte storage tank and aerosol introduction to the cell(s) from the liquid treatment tank. The system of the invention further provides switching means to switch the liquid circulation between the cell(s) and the electrolyte tank to circulation between the cell(s) and an aerosol which is formed from liquid acid or from an acidic solution stored in the liquid treatment tank. An aerosol propulsion element is used to convert the liquid acid or the acidic solution into an aerosol.

In one embodiment, the system of this invention further comprises a pH monitoring element, wherein the element is in contact with the treatment liquid/solution. According to this aspect and in one embodiment, the pH monitoring element in systems of this invention is a pH meter. In one embodiment, the pH monitoring element in systems of this invention is a voltage meter. The pH monitor may be located in the liquid treatment tank. The pH monitoring element monitors the pH of the liquid in the liquid treatment tank. In case the pH value is higher than a certain operation value, the liquid in the treatment tank can be replaced or treated in order to lower the pH. In another embodiment, the pH monitor is placed in an aerosol waste tank. According to this aspect and in one embodiment, the aerosol used to treat the electrodes is directed to an aerosol waste tank. Monitoring the pH of the liquid or of the aerosol in the aerosol waste container enables to evaluate and to control the action of the aerosol on the liquid in the cells and the liquid on the electrode.

In one embodiment, following passage of aerosol through the battery cell(s), the aerosol is directed back to the liquid treatment tank. According to this aspect and in one embodiment, after a number of aerosol treatment cycles of the battery cell(s) and electrodes, the treatment liquid/solution in the liquid treatment tank may acquire a higher pH. This can be the result of the drag of electrolyte residue by the flow of propellant gas.

According to this aspect and in one embodiment, acid is added to the treatment liquid/solution in the treatment liquid tank after a number of aerosol treatment cycles in order to maintain/obtain/reach a lower pH.

In another embodiment, the pH of the liquid in the liquid treatment tank is not considerably elevated even after many cycles of battery aerosol treatment wherein aerosol from the battery is directed back to the liquid treatment tank following aerosol battery treatment.

In one embodiment, in order to avoid pH elevation in the liquid treatment tank, the aerosol waste ejected from the cell(s) is transferred to a separate aerosol waste container or to an external region. The aerosol waste container is connected to the cell(s) in one embodiment. In one embodiment, the amount of used aerosol (aerosol that passed through the cells) may be low enough and contains mainly water and therefore may be directed out of the system to the atmosphere with no imposed hazards.

There are many possible schemes and elements that can be used to construct and to operate systems of this invention. Batteries, cells, electrodes, tanks, aerosol generating elements, connectors, pumps, motors and valves can be of various numbers, shapes and sizes and can be operated by different mechanisms. Different circulation paths and parameters, different timing schemes and any volumes/weights of gases/liquids/solutions may be used in embodiments of this invention. Any procedure to produce an aerosol can be used in systems and methods of this invention.

One embodiment of a system of the invention is described with reference to FIG. 1. FIG. 1 schematically demonstrates an aerosol shutdown system for a metal-air battery operated with a recycling electrolyte. In the figure, a metal air battery (10) is described. The system comprises an electrolyte tank (1), a pump (2), a liquid treatment tank (3) an aerosol generating element (optionally ultrasonic) (4) a gas (air) blower (5), a valve (6), cells (7), valve (8) and valve (9).

During the operation of the battery, the electrolyte is in the cell(s) (7), and is circulated through the system by pump (2). The electrolyte may optionally be spontaneously circulated as a result of reaction heat and convection.

Valves (9) and (6) are closed. Valve (8) is open. The dashed lines in electrolyte tank (1) and in liquid treatment tank (3) represent liquid level. The aerosol generation element (4) for example, is an ultrasonic wave generator, or a pneumatic atomizing nozzle.

As noted herein above, systems of this invention may be configured in many ways to achieve the desired operation. One embodiment for method of treating an electrode according to the invention is described by using the system presented in FIG. 1. According to this embodiment, the method includes (i) an electrolyte draining step (comprising an air blowing step) and (ii) an electrode spraying step.

The blowing step comprises short (from seconds to minute) application of flow of propellant gas (air in this example) at maximum available pressure and flow rate through the battery. No aerosol generation is applied at this step. The purpose of this action is to promote the residual electrolyte left-overs entrapped in the battery to be dragged outside to the aerosol waste tank. This step reduces the amount of electrolyte residue in the battery, and thus allows to reduce the amount of acid solution needed for the aerosol treatment cycle.

In this example a method of treating an electrode is thus comprising:

1. Electrolyte is drained from the cell(s) to a liquid storage container (pump 2 is stopped allowing the electrolyte back to the tank). Valve 6 is opened, valve 8 is closed and blower 5 is operated, thus pushing electrolyte from inside the cells to the electrolyte tank 1.
2. The electrode(s) in the cell(s) is sprayed by an aerosol; valve 9 is opened and aerosol propulsion element 4 is activated such that aerosol is pushed by the blower into the cells.
3. Following the electrode treatment process, treatment liquid residues, electrolyte residues and mixtures thereof are directed back to the liquid treatment tank 3 through valve 9.

In this example, no aerosol waste container is used. However, in other embodiments, aerosol waste container is used to collect treatment liquid residues, electrolyte residues and mixtures thereof.

In one embodiment, this invention is directed to a vehicle comprising the shutdown/standby system of this invention. In one embodiment, this invention provides an electric vehicle comprising the shutdown/standby system of this invention for treating/spraying an electrode of a metal-air battery, wherein energy from said metal air battery is used for vehicle propulsion, and wherein said shutdown system for treating/spraying is activated for preparing the battery for a standby mode.

In one embodiment, the system, electric vehicle, and methods of this invention include an electrode. In one embodiment, the electrode is an alkaline metal-air battery electrode. In one embodiment, the electrode comprises metal. In one embodiment the electrode comprises metal alloy. In one embodiment, the electrode is a zinc, or magnesium, or an aluminum electrode.

In one embodiment, the system, electric vehicle, and methods of this invention comprise a treatment liquid or solution. In one embodiment the term "treatment liquid" or "treatment solution" in this invention refers to a liquid comprising an acid or acidic solution or neutralizing solution that is used for generating aerosol for treating the electrode. In one embodiment, the acidic solution used to form the aerosol is an aqueous solution. In one embodiment, the acidic solution in the liquid treatment tank is kept at pH range 6-7, or 5-6, or 4-5, 3-4, 2-3, 1-2, 1-4, 4-7, 3-6, 3-5, 4-6, 2-6, 1-7, 0-7. In one embodiment, the acidic solution may be of any pH throughout the acidic pH range.

In one embodiment, the aerosol droplets that are introduced to the cell(s), contact the electrolyte residue on and within the electrode and on other inner parts of the cell. The aerosol droplets mix with the electrolyte residue and the pH of the electrolyte residue is lowered. In one embodiment, the pH of the electrolyte residue after mixing or interacting with the aerosol reaches a pH that is in a safe zone in terms of electrode reactions. The pH of the electrolyte residue after being contacted with the aerosol is such that the electrode is maintained stable.

In one embodiment, the electrode comprises metal. In one embodiment, the electrode comprises zinc, magnesium, aluminum, aluminum-lithium alloy, alloys of these metals, and mixtures thereof. In one embodiment, the safe pH range at shutdown/standby mode varies for different metals/alloys and mixtures thereof. In one embodiment, the pH which maintains the electrode stable ranges between 4 and 9. In another embodiment, the pH is between 4 and 10. In another embodiment, the pH is between 5 and 8. In another embodiment, the pH is between 6 and 8. In another embodiment, the pH is between 5 and 9. In another embodiment, the pH is between 6 and 10.

In one embodiment, the system, electric vehicle, and methods of this invention comprise aerosol circulation elements. In one embodiment, the aerosol circulation elements comprise a reservoir, a tank, a container, a hose, a tube, a pipe, a connector, a pump, a piston, a motor, a syringe, a valve or a combination thereof.

In one embodiment, standby is a state in which the battery is not operated. In one embodiment, standby is a state wherein the battery is not operated as an electrochemical cell. In one embodiment, standby is when battery is not connected to a load. In one embodiment, standby is when no electric current is drawn from the battery. In one embodiment, standby means a state where (preferably) no electrochemical reaction occurs on the electrode. In one embodiment, standby state is when the battery is not in use. In one embodiment, standby state follows the shutdown of the battery. In one embodiment, Standby state is a mode. In one embodiment, shutdown is an action of transferring the battery from operation mode to the standby mode. Standby state is further referred to by a "standby mode" term. In one embodiment, standby is a battery mode that can be readily changed back to operation mode or to a working mode.

In one embodiment, the present invention relates to the application of the aerosol treatment system to alkaline metal-air batteries, e.g. to metal-air batteries with aqueous alkaline electrolyte, and to alkaline fuel cells. The metal-air batteries may be metal-air rechargeable batteries or metal-air non-rechargeable batteries.

In one embodiment, the electrochemical cell is a metal-air battery and the anode is selected from the group consisting of zinc, magnesium, lithium, aluminum, alloys of these metals, and mixtures thereof. In one embodiment, the anode comprises Al. In one embodiment, the anode comprises Zn. In one embodiment, the anode comprises Mg. In one embodiment, the anode comprises alloys of any combination of zinc, magnesium, lithium and/or aluminum. In one embodiment, batteries of the invention comprise an electrochemical cell. In one embodiment, the electrochemical cell comprises a cathode, an anode and a region that can be filled with an electrolyte. In one embodiment, a cell comprises one anode and two cathodes. In one embodiment, any number of cathodes and anodes are used and the number of the cathodes is or is not equal to the number of anodes in the cell. In one embodiment, the battery comprises more than one cell. In one embodiment, the battery comprises 2 cells. In one embodiment, the battery comprises 6, 10, 12, 16, 24 or 32 cells. In one embodiment, the battery comprises any number of cells that is suitable for a certain application of the battery. Embodiments of the invention refer to one cell and/or to more than one cell. According to this aspect, the term cell(s) is used. The term cell(s) implies that the relevant embodiment may be applied to one cell or to more than one cell.

In one embodiment, the electrolyte used in the battery cells is an alkaline electrolyte. In one embodiment, alkaline electrolyte is an electrolyte with a pH value higher than 7.0. In one embodiment, the alkaline electrolyte comprises an aqueous solution. In one embodiment, the alkaline electrolyte comprises KOH, NaOH or a combination thereof. In one embodiment, the alkaline electrolyte comprises a 30% by weight aqueous solution of KOH or NaOH. In one embodiment, the concentration of the alkaline electrolyte aqueous solution ranges between 30% and 40%. In one embodiment, the concentration of the alkaline electrolyte aqueous solution ranges between 20% and 30% or between 15% and 30% or between 10% and 45%.

In one embodiment, the aerosol generation element is an element that produces aerosol by atomizing droplets of acid or acid solution from the stock in the liquid treatment tank in the flowing propellant gas. In one embodiment the aerosol generation element is an ultrasonic device that is placed in contact or within the treatment liquid. Once operated, the ultrasonic waves in the treatment liquid font) an aerosol. The aerosol or portions thereof accumulates on top of the treatment liquid level and can be directed through a hose to the battery cell(s).

In one embodiment, the liquid treatment tank comprises a pressurized container comprising the treatment liquid and a gas propellant. Once the pressurized container is opened, the pressurized gas propellant forms an aerosol from the treatment liquid present in the pressurized container. The aerosol or portions thereof are directed to the battery cell(s). In one embodiment, the opening of the pressurized container is directly attached to the cells. In another embodiment, the opening of the pressurized container is connected to the battery cells by a hose. According to this aspect and in one embodiment, the aerosol propulsion system comprises the pressurized container.

In one embodiment the pressure of the propellant gas is used for formation of aerosol. In this case a pneumatic atomizing nozzle(s) is (are) used as an aerosol generating device in the liquid treatment tank.

An anode in a metal air battery with an alkaline electrolyte, and in particular in an aluminum air battery, may suffer corrosion during the time that the battery is not in use. This implies energetic inefficiency (consumption of raw materials), possible difficulties in the consequent operation, and possible hazard due to hydrogen that is released from the corrosion process. A straight forward approach to halting is to drain the electrolyte from the cells, but this is usually not enough, as drops of alkaline electrolyte remain on the surface of the anodes.

In one embodiment, this invention provides a method for battery shutdown followed by a standby mode, the method comprises:

transferring an electrolyte solution of a battery from the cell(s) to an electrolyte storage tank;

circulating aerosol through the cell(s) of the battery; and thereby preparing the battery to a standby mode.

In one embodiment, this invention provides a method for treating an electrode operated in a liquid electrolyte at a shutdown/standby mode, said method comprises:

separating said electrode from the bulk of said liquid electrolyte; and bringing said electrode into contact with an aerosol.

In one embodiment, the aerosol reacts with liquid electrolyte residue on and within said electrode or electrode surface. In one embodiment, the reaction neutralizes said liquid electrolyte such that it does not further react with the electrode. In one embodiment, neutralizing means changing the properties of the electrolyte such that it can not deteriorate or harm the electrode. In one embodiment, neutralize means to lower the pH to a neutral or to a close to neutral pH range such that electrolyte can not initiate undesired electrode chemical reactions.

In one embodiment and with reference to FIG. 1, methods of this invention using a system of this invention include the following steps:

The electrolyte is drained from the battery (10) through the stopped pump (2) to the electrolyte tank (1); when the battery is empty of electrolyte, valve (8) is closed and valves (6) and (9) are opened, disconnecting the electrolyte tank (1) from the battery, and connecting the liquid treatment tank (3) to the battery (10). At this position, utilizing an aerosol propulsion element (4) aerosol starts to circulate from tank (3) through the battery. The electrolyte residue in the battery, react with the aerosol, changing the pH of the electrolyte residue to a pH value where anode metal is stable, thus preventing electrode damage.

Aerosol droplets circulated through the cell(s) are directed back to the tank (3). In another embodiment, aerosol droplets circulated through the cell(s) are directed to a waste tank.

An embodiment of electrode treatment method (or halting procedure) according to the invention and with reference to FIG. 1, includes a draining step, an air blowing step and a spraying step as follows:

1. Draining:
   a. pump (2) is stopped;
   b. valve (6) is opened;
   c. air blower (5) is operated, thus pushing the electrolyte from inside the cells to the electrolyte tank (1).
2. Spraying:
   a. valve (8) is closed;
   b. valve (9) is opened;
   c. aerosol propulsion element (4) is activated and aerosol is pushed by the air blower into the cells through valve (6). Treatment liquid residues from the electrode treatment process return to the liquid treatment tank (3) through valve (9).

In one embodiment, this invention provides a method for battery shutdown followed by a standby mode, the method comprises:

a. providing a system for treating an electrode of a metal-air battery at shutdown/standby mode, the system comprising:
   a battery comprising a metal anode;
   a liquid treatment tank;
   an aerosol generation element, and
   an aerosol propulsion system;
b. transferring an electrolyte solution from the battery to an electrolyte storage tank;
c. circulating aerosol through the battery;

wherein aerosol circulation through the battery prepares the battery to a standby mode.

In one embodiment, aerosol circulation provides aerosol contact with electrolyte residue in the battery, thus reducing the pH of the residual electrolyte in the battery. In one embodiment, aerosol circulation through the battery provides contact between aerosol acidic droplets and residual electrolyte in the battery. According to this aspect and in one embodiment, the acidic droplets in the aerosol acidify the residual electrolyte in the battery. In one embodiment, acidifying the residual electrolyte in the battery renders the residual liquid harmless to the battery components.

According to methods of the invention, the aerosol comprising small droplets of active material and a gas carrier. The small droplets of active material (e.g. water or acidic solution) react with the basic liquid residue on the electrodes in the cell. This reaction neutralizes the basic liquid residue on and optionally within the pores of the electrode, thus preventing unwanted chemical reactions. Since the carrier in the aerosol is gas, the volume and weight of the aerosol liquid droplets used to treat the electrode is much smaller than it would have been if the carrier was a liquid (e.g. if instead of an aerosol a bulk liquid acid was used). The volume of the liquid droplets in the aerosol is yet sufficient to enable effective battery rinsing. Accordingly, for such electrode treatment process, a much smaller liquid weight is needed as compared with a treatment process where instead of aerosol, a bulk liquid is used. Small weight is a substantial advantage for a battery. This is especially important if the battery is used in an electric vehicle.

In one embodiment, the volume of acid neutralizing agent should be sufficient to acidify or to properly lower the pH of the amount of residual alkali which remains on the surface of the electrodes after battery emptying (electrolyte pumping out, and air blowing). This amount is not definite, but approximately ranges below 1 ml per square dm for the electrode geometric area of relatively low surface area electrodes such as aluminum. The volume of the acidic agent in the aerosol might be a few milliliters per square dm for high surface area electrodes such as air electrodes.

The acidic droplets volume depends on the concentration of the acid solution in the droplets. The more concentrated acid is used, the less total volume should be atomized into the battery to get the proper shutdown.

In order to neutralize the liquid residue on the electrodes and on other parts of the battery cell, a neutralizing liquid agent (e.g. acid or acidic solution) is needed. When such liquid neutralizing agent is used in a liquid carrier, the total amount of liquid needed is very large. This is because the carrier liquid should be applied in a volume/weight must fill up the inner volume of the battery, surround/immerse the electrodes, and flow through the cells.

According to methods of this invention, instead of using bulk liquid carrier (i.e. liquid carrier comprising a neutralizing agent), a gas carrier is used. The gas carrier carries the liquid small droplets comprising the neutralizing agent. The weight of the aerosol (gas carrier+liquid neutralizer droplets) is much smaller than the weight of a corresponding bulk neutralizing liquid. This small weight improves the performance of the battery system. A major advantage of methods and systems of the present invention is the small weight needed for the termination of the undesired processes of the electrodes at shutdown.

To illustrate huge weight and volume benefit that the current invention contributes to metal-air battery systems, an example of a practical 5 kW aluminum-air battery system is given. Accordingly and in one embodiment, such battery has 15-20 L of inner volume of the battery. At the end of battery operation, and emptying of the electrolyte, about 0.1-0.2 L of the alkali electrolyte solution retains in the battery, A stock of 0.05-0.1 L of acid solution, sprayed in the battery in the form of aerosol is enough to effectively neutralize the alkali on the metal anode surfaces, and to provide battery preservation during standby. Comparing to that, if liquid (water) is used instead of gas for the transport of the same amount of the acid into the battery, the amount of liquid carrier needed is at least equivalent to the inner battery volume (15-20 L, as mentioned above) or practically even more, which accordingly adds to the battery system a tank of the respective weight and volume.

Accordingly and in one embodiment, the volume of the liquid acid or acidic solution used to form the aerosol ranges between 0.05 L-0.1 L or between 0.01 L-0.05 L, or between 0.005 L-0.05 L, or between 0.05 L-1.0 L or between 0.01 L-0.5 L, or between 0.005 L-2.00 L.

In one embodiment, the liquid treatment tank holds the liquid acid or liquid acid solution and therefore the dimensions of the liquid treatment tank match the volume of the liquid used (acid liquid or solution). Accordingly, the volume of the liquid treatment tank ranges between 0.05 L-0.1 L or between 0.01 L-0.05 L, or between 0.005 L-0.05 L, or between 0.05 L-1.0 L or between 0.01 L-0.5 L, or between 0.005 L-2.00 L for a practical 5 kW aluminum-air battery system.

In one embodiment, the volume of the acidic liquid (liquid acid or acidic liquid solution) used to form an aerosol and to treat a battery according to systems and methods of the invention is 1% of the inner volume of the battery. In one embodiment, the volume of the acidic liquid ranges between 0.1%4% of the inner volume of the battery. In one embodiment, the volume of the acidic liquid ranges between 0.1%-10% or between 0.1%-5% or between 0.01%-1% or between 0.01%-10% or between 1.0%-2.0% or between 0.01%-2% or between 0.001%-1% or between 0.05%-2.5% of the inner volume of the battery. In one embodiment, the volume of the liquid treatment tank matches the volume of the acidic liquid needed to form the aerosol and accordingly, the volume of the liquid treatment tank ranges between 0.1%-1% of the inner volume of the battery. In one embodiment, the volume of the liquid treatment tank ranges between 0.1%-10% or between 0.1%-5% or between 0.01%-1% or between 0.01%-10% or between 1.0%-2.0% or between 0.01%-2% or between 0.001%-1% or between 0.05%-2.5% of the inner volume of the battery. In one embodiment, the volume of the liquid treatment tank is 1% of the inner volume of the battery.

In one embodiment, the aerosol is the treatment composition (or the cleaning medium). In one embodiment, the treatment composition comprises a neutralizing agent and a carrier. In one embodiment, the carrier is a gas carrier. In one embodiment, the treatment composition/cleaning medium comprises a gas carrier. In one embodiment, the treatment composition/medium does not comprise a liquid carrier. In one embodiment, the treatment composition/medium does not comprise a bulk liquid carrier. In one embodiment, the neutralizing agent is in the form of airborne droplets. In one embodiment, the neutralizing agent comprises water. In one embodiment, the neutralizing agent comprises acid or acidic aqueous solution. In one embodiment, the treatment composition/medium is in the form of an aerosol. In one embodiment, the treatment composition/medium is not a bulk aqueous solution. In one embodiment, the treatment composition/medium is not a bulk acidic aqueous solution. In one embodiment, the treatment composition/medium is not bulk water.

In one embodiment, this invention provides a procedure for shutting down a metal air battery operated with liquid alkaline electrolyte. According to this aspect and in one embodiment, the electrolyte is pushed out of the cells by air. Air pressure is applied to an inlet or an outlet of the cell/stack of cells, thus pushing out/removing the liquid electrolyte out of the cells. Air flow may be maintained for an additional period of time in order to clear the anode surface and the cell from electrolyte drops. An aerosol of an acid is sprayed into the cells, reacts with the remaining alkaline electrolyte on the surface of the anodes, and stops the corrosion process of the electrode.

In one embodiment, aerosol is generated by spray atomizer using atomizing nozzle, or nebulizer of any other type, operated by pneumatic or hydraulic pressure. In one embodiment an ultrasound sonication is used for dispersion of liquid droplets of neutralizing agent (e.g. solution) in the carrier gas stream.

At the beginning of battery operation, the liquid treatment tank may be loaded by liquid acid or aqueous acidic solution. This load can be used for aerosol treatment in multiple battery shutdown cycles until the tank is emptied (in the case the system have optional waste tank) or the water (or acidic solution) becomes saturated by the products of interaction of the electrolyte with the water/acid (when the waste is returned to the treatment tank). Saturation of the treatment solution depends mostly on the amount of electrolyte retained in the battery after emptying.

In one embodiment, the mechanism of the disclosed treatment method is based on neutralization of alkaline electrolyte by acidic neutralizing agent. As discussed above, a key issue of metal-air battery shutdown is the prevention of metal corrosion during battery standby mode. Accordingly, the major requirement to the battery shutdown process is to bring the liquid media entrapped in the cell (the battery), and, especially on the surface of the metal electrode, to pH values which are non-corrosive towards the relevant metal.

In one embodiment, the mechanism of the disclosed treatment method that is based on neutralization of alkaline electrolyte by acidic neutralizing agent is applied to aluminum-air battery. As discussed above, a key issue of aluminum-air battery shutdown is the prevention of aluminum corrosion during battery standby mode. Accordingly, the major requirement to the battery shutdown process is to bring the liquid media entrapped in the cell (the battery) to pH values which are non-corrosive towards a metal anode.

A basic principle of operation of the disclosed battery shutdown system comprises neutralization of residual alkali electrolyte using an acidic neutralization agent. The practical application of this principle is challenging due to a number of factors:

The alkaline metal-air battery electrode is an active metal that is unstable at both basic and acidic pH values. Specifically, aluminum is unstable at a pH value higher than 9 and it is also unstable at a pH value lower than 4. Therefore, adding acidic neutralizing agent in excess may result in a solution pH that is too acidic.

In one embodiment, the electrolyte to be neutralized is effectively not a pure alkali solution, but a worn-out mixture, containing different metal compounds (e.g. aluminum compounds) in addition to alkali and water. The aerosol comes in contact with all parts of the aluminum-air battery, so it should be inert to the air electrodes, especially to the air reduction electrocatalyst and to other battery construction materials. This requirement restricts the choice of the acidic neutralization agent;

In one embodiment, aerosol residue remains in the battery after the treatment cycle, and is harmless to consequent battery operation.

Aluminum is considered stable at pH range from 4 to 9, so the purpose of the shutdown treatment operation is to bring the liquid residue in the battery to this pH range.

In one embodiment, the electrode is an anode and said liquid electrolyte is an alkaline liquid electrolyte. In one embodiment, the aerosol comprises liquid droplets and a gas propellant.

In one embodiment, the aerosol airborne liquid droplets are neutral or acidic in terms of pH. In one embodiment, the aerosol is generated using an aerosol generation element.

In one embodiment, prior to the separating step, the liquid electrolyte is contained in the cell(s) and the electrode is immersed in the liquid electrolyte.

In one embodiment, the separating step comprises draining or pumping the bulk of the liquid electrolyte from the cell into an electrolyte storage tank. In one embodiment, the bulk of the electrolyte is emptied from the cells, but electrolyte residue remains on and within the electrode and on other components and parts of the cell. The electrolyte residue may comprise droplets, drops, thin layers, thin films and molecules adhered to the electrode and to other parts of the cell.

In one embodiment, said draining or pumping is conducted by blowing air into a cell inlet and allow the liquid to drain through a cell outlet. In one embodiment, air blowing into the cell is conducted using a pump. In one embodiment, after the bulk of the electrolyte liquid is pushed out of the cells by a stream of air, air blowing into the cell continues in order to further remove liquid residues from the cell.

In one embodiment, the bulk of the electrolyte refers to the liquid electrolyte that is drained from the cell(s) into a liquid storage tank. Electrolyte bulk refers to the main portion of the electrolyte present in the cells before draining. In one embodiment, electrolyte bulk that is removed from the cells upon shutdown is a very large amount of electrolyte as compared with the electrolyte residue remaining in the cells after draining. In one embodiment, the bulk of the electrolyte drained from the cells comprises more than 99%, more than 95%, more than 90%, more than 85%, more than 80%, more than 75%, of the volume of the total electrolyte present in the cells before draining.

In one embodiment, systems of the invention comprise an electrolyte storage tank. The electrolyte storage tank is connected to the battery. Electrolyte is circulated between the electrolyte storage tank and the cells. Electrolyte from the electrolyte storage tank is transferred to the battery prior to battery operation. Electrolyte is transferred to the battery in order to start battery operation. Electrolyte is drained or removed from the battery upon shutdown to the electrolyte storage tank, where it is stored during the standby mode. In one embodiment, electrolyte is circulated through the cell during battery operation.

In one embodiment, the electrolyte storage tank is connected to the cells by one or more hoses. In one embodiment, open/close valves are used to direct an electrolyte from the cells to the electrolyte storage tank and from the electrolyte storage tank to the cells.

In one embodiment, the step of bringing said electrode into contact with said aerosol comprises introducing or spraying said aerosol into said cell(s)/battery, or spraying of aerosol into the flow of propellant gas, which carries aerosol droplets thereafter into the cell(s) (battery), where said droplets deposit on the inner surfaces of the battery, including the surface of the electrodes.

In one embodiment, aerosol that is sprayed into the cell reacts (at least partially) with electrolyte residue on and within the electrode and on other components of the cell. Such reaction lowers the pH of the electrolyte waste in the cell and on/in the electrode. The lower pH reaches a value that is safe for the electrode. At the lower pH value, undesired chemical reactions on/in the electrode are prevented, eliminated, reduced or becomes negligible.

In one embodiment, after the aerosol is passed through the cells, the waste aerosol is directed to an aerosol waste tank. The aerosol waste is thus being kept in a waste tank such that the used aerosol does not affect the properties of the fresh treatment liquid. In one embodiment, when the amount of aerosol waste compared to the amount of liquid in the liquid treatment tank is small to the level it will not affect the properties of the fresh treatment liquid, if the aerosol waste is directed back to the liquid treatment tank. In another embodiment, where the amount of aerosol waste is small, to the level it will not impose hazards to the external environment, the aerosol waste may be pushed out of the cells into the atmosphere.

In one embodiment, after the aerosol is passed through the cells, a stream of air or other propellant gas is passed through the cell in order to further remove aerosol and electrolyte residues from the cell.

In one embodiment, the electrode functions as the anode in a metal-air battery. In one embodiment, the anode is a metal anode. In one embodiment, the anode comprises metal and/or metal alloy. In one embodiment, the anode comprises zinc, magnesium, aluminum-lithium alloy, alloys of these metals, and mixtures thereof. In one embodiment, the metal air battery is used in an electric vehicle. In one embodiment, systems of this invention are used in an electric vehicle.

In one embodiment, the method of this invention comprises a circulating step. In one embodiment, the circulating step includes circulating an aerosol between liquid treatment tank and the electrochemical cells of the battery.

In one embodiment, in methods of this invention the circulation of the aerosol is performed between the cells of the battery and between a liquid treatment tank that is connected to the battery. In one embodiment, the connection comprises an open/close valve(s).

In one embodiment, the aerosol generation element comprises the atomizing nozzle, operated by pneumatic pressure of propellant gas, or by hydraulic pressure of neutralizing agent. In another embodiment the aerosol generation element is comprises an ultrasonic liquid atomizing element. Any other procedure for forming an aerosol may be used with the methods of this invention.

In one embodiment, prior to passing an aerosol through the cells, a gas stream such as air is forced through the battery/cells in order to further eject electrolyte liquid residue from the cells/battery. In one embodiment, following the step of passing an aerosol through the cells, a gas stream such as air is forced through the battery/cells in order to further eject electrolyte residue liquid, treatment solution residue, products thereof or combination thereof from the cells/battery.

In one embodiment, circulating an aerosol through the cells is conducted for short or for long periods of time. In one embodiment, aerosol treatment is conducted in pulses or continuously. In one embodiment, the concentration of the aerosol can be of any range suited for electrode and battery treatment.

In one embodiment, systems and methods of this invention provide instant and effective battery shutdown. In one embodiment, systems and methods of this invention provide prevention of metal anode corrosion. The effective suppression of electrodes corrosion processes, provided by systems and methods of this invention allows prolonged (to unlimited) unlimited standby duration, without the damage to electrodes and battery performance. In one embodiment, systems and methods of this invention provide easy and fast battery re-activation.

Definitions

In one embodiment, aerosols of this invention are suspensions of liquid particles/liquid droplets in a gas. The aerosol includes both the particles and the suspending gas. The concentration of the aerosol may be measured as mass concentration defined as the mass of particulate matter per unit volume with units such as $\mu g/m^3$. It can also be measured as number concentration, the number of particles per unit volume. In one embodiment, an aerosol comprises liquid droplets. In one embodiment, the gas is used to propel the liquid droplets.

Liquid electrolyte residue is liquid electrolyte that was left in the electrochemical cell or battery after draining of the cell from the bulk electrolyte. Liquid electrolyte residue comprises drops, droplets, films and/or other small amounts of liquid that adhere or reside on cell parts and on the electrodes. Electrolyte residue can be left inside pores of the electrode following draining, i.e. within the electrode.

In one embodiment, the term ‘battery’ and the term ‘cell(s)’ are interchangeable. In one embodiment, cell(s) are electrochemical cell(s). In one embodiment, the term) ‘battery’ is synonym to the term cell, or any number of connected cells. In another embodiment, the battery comprises a cell or cells.

In one embodiment, the term) “a” or “one” or “an” refers to at least one. In one embodiment the phrase “two or more” may be of any denomination, which will suit a particular purpose. In one embodiment, “about” or “approximately” may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

The following examples are presented in order to more fully illustrate the preferred embodiments of the invention. They should in no way be construed, however, as limiting the broad scope of the invention.

EXAMPLES

Example 1

Aluminum-Air Battery Operation, Halting, and 96 Hours Standby with No Aerosol Shutdown Treatment 1 kW aluminum-air battery (10 cells in series, 200 $cm^2$ electrodes cross-section) was filled by electrolyte (comprised mostly of water, 25%-35% w/w potassium hydroxide and 0.1-1% of sodium stannate). Initially, the electrolyte was at room temperature. When electrolyte circulation through the battery started, the electrolyte began to heat-up, and electricity production began as well.

Standard battery start-up procedure was applied as follows: battery voltage was stabilized at 11V (by applying current via an electronic load). Due to the heat effect of the aluminum-water reaction, the temperature of the electrolyte begins to rise. Electrolyte heating causes, in turn, a rise of electric current, which may be drawn while maintaining the constant voltage 11V. The startup procedure continued until current reached 70 A and the temperature reached 55° C. (measured at the electrolyte outlet of the battery).

Following this step, temperature was maintained constant (55° C.) by redirection of the electrolyte flow through a radiator. Current was maintained constant as well (70 A, stabilized by electronic load).

After about two hours of battery operation at 55° C. and 70 A current, the battery was disconnected, and completely emptied of electrolyte. No additional treatment was applied, and the battery was left in standby for 96 hours.

Afterwards, an attempt of battery restart was conducted. Battery was connected to the electronic load and fresh electrolyte was circulated into the battery. Opposite to the process described above, the battery failed to heat up, and to produce any significant current.

Figure 2:
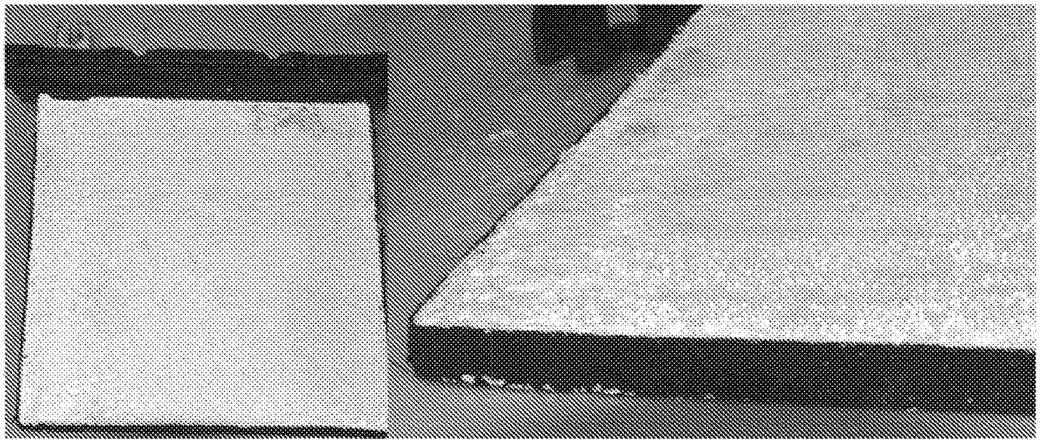
FIG. 2 shows corrosion/passivation layer that forms on the surface of a used aluminum anode after operation cycle in alkali electrolyte with no aerosol shut down procedure applied.

Battery disassembly and inspection of the anodes discovered the reason of battery failure: aluminum anodes were coated by a thick passivation layer of hydroxide (FIG. 2). FIG. 2 demonstrates the corrosion/passivation layer that formed overnight on the surface of the used aluminum anode after operation cycle and shut down by electrolyte drainage only. As is seen from the image, the passivation layer is a coarse, thick layer, hardly soluble in cold alkali electrolyte.

It was found that the hydroxide passivation layer, if reaches above a certain thickness and "age", is not readily soluble in the fresh cold alkali electrolyte, and it effectively blocks the electrochemical activity of the aluminum anode. If no proper shutdown procedure was applied, such passivation layer formed on the surface of the aluminum anodes during standby, prevented battery smooth startup, and/or rendered the battery inoperable.

Example 2

Aluminum-Air Battery Operation, Halting, and 24 Hours Standby with Aerosol Shutdown Treatment 1 kW aluminum-air battery was started up, and operated for approximately 2 hours at 55° C., 70 A as described in Example 1 herein above. Following battery operation, the electrolyte was removed from the battery and pumped back to the electrolyte tank.

Following electrolyte removal, a shutdown procedure was applied as follows:

1. Clean air flow was directed to the battery through the electrolyte circulation pathway. Air flow rate was maintained in the range of 6-10 L/min;
2. Aerosol of phosphoric acid solution was continuously injected through the air inlet into the battery. The aerosol was produced in a small chamber filled with 15% aqueous solution of phosphoric acid. The chamber was equipped with a submerged ultrasonic emitter. The power of the ultrasonic emitter was previously tuned to the value, providing atomization of liquid at a rate 8 ml/min. Aerosol chamber outlet was connected to the air line, thus providing continuous injection of the freshly produced aerosol into the air flow, and transport of the aerosol into the battery.
3. Following 30 min of the aerosol injection, the battery was disconnected from the air flow, and left for standby.

Figure 3:
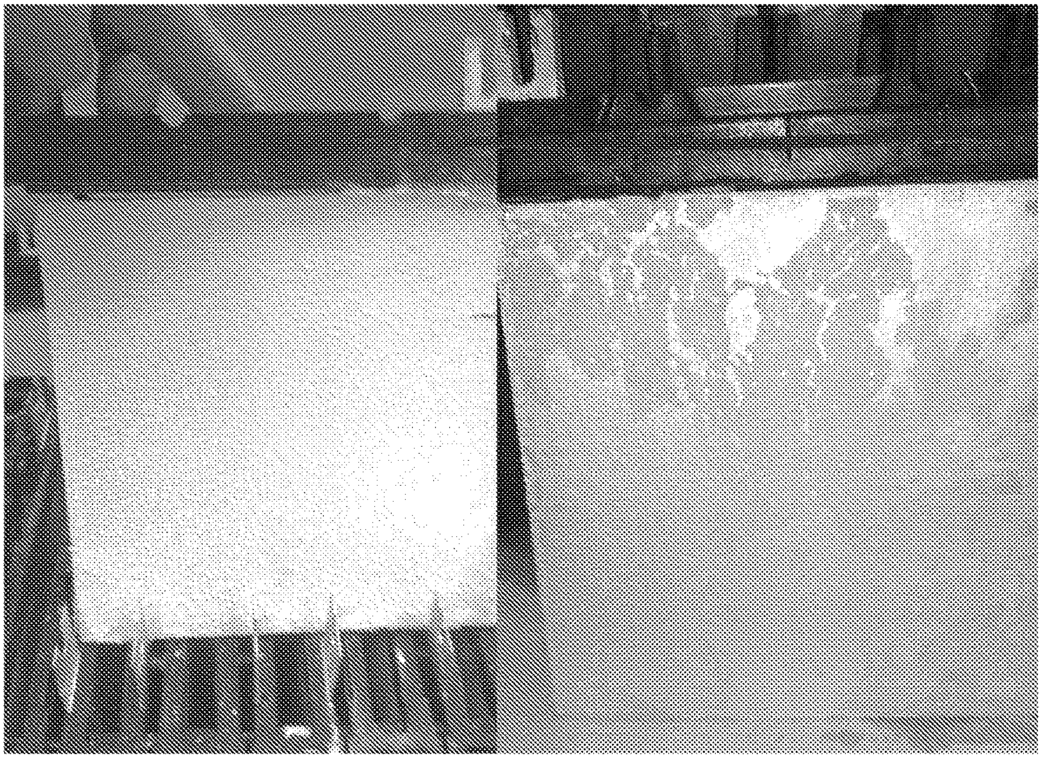
FIG. 3 shows corrosion/passivation layer on the surface of a used aluminum anode that passed operation cycle followed by aerosol shut down procedure by phosphoric acid solution aerosol.

After 24 hours of standby, the battery was disassembled, and the anodes were inspected. The visual appearance of the anodes showed some layer on the aluminum surface (FIG. 3, left). The morphology and properties of this layer were found to be dramatically different from those of the anode that was not aerosol-treated. Instead of hard, crystalline layer hardly soluble in cold alkali, as found in Example 1, this layer was "soft", fine, smooth and was readily removed by water rinsing, discovering the shiny aluminum metal surface beneath (FIG. 3, right).

Example 3

Aluminum-Air Battery, Operation, Halting, Aerosol Shutdown Treatment and 24 Hours Standby, Followed by Restart 1 kW aluminum-air battery was started up, and operated for approximately 2 hours at 55° C., 70 A as described in Example 1. The left graph of FIG. 4 displays battery voltage and current, and electrolyte temperature during the operation. The battery was then shut down using phosphoric acid aerosol treatment as described in Example 2.

Figure 4:
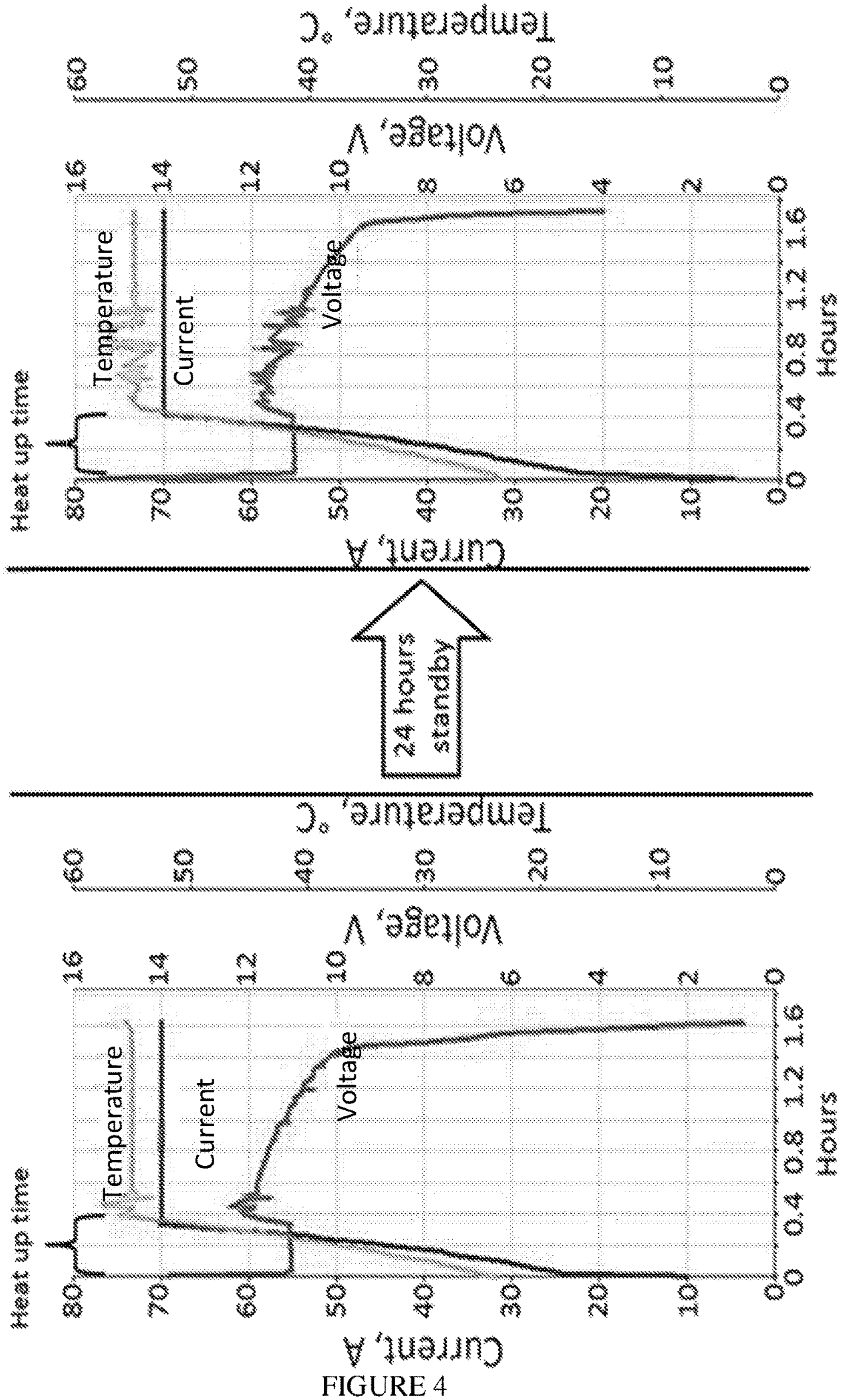
FIG. 4 shows voltage, current and electrolyte temperature graphs of two operation cycles of aluminum-air battery with phosphoric acid solution aerosol shut down and 24 hours standby: ease of restart and performance preservation.

After 24 hours of standby, the battery was filled with fresh electrolyte, restarted and operated at 55° C., 70 A (FIG. 4, right graph).

Comparing the left and right graphs in FIG. 4, one can see that the applied aerosol shutdown procedure provided proper conservation of the battery. No damage or performance degradation, or any substantial change in heat-up duration occurred during 24 hours of standby. The battery was easily restarted and battery performance was preserved.

Example 4

Aluminum-Air Battery Operation, Halting, Aerosol Shutdown Treatment, 96 Hours Standby and Restart 1 kW aluminum-air battery was operated, shut down, and re-operated, as described in Example 3, except for the standby time, which was 96 hours in the current Example.

Figure 5:
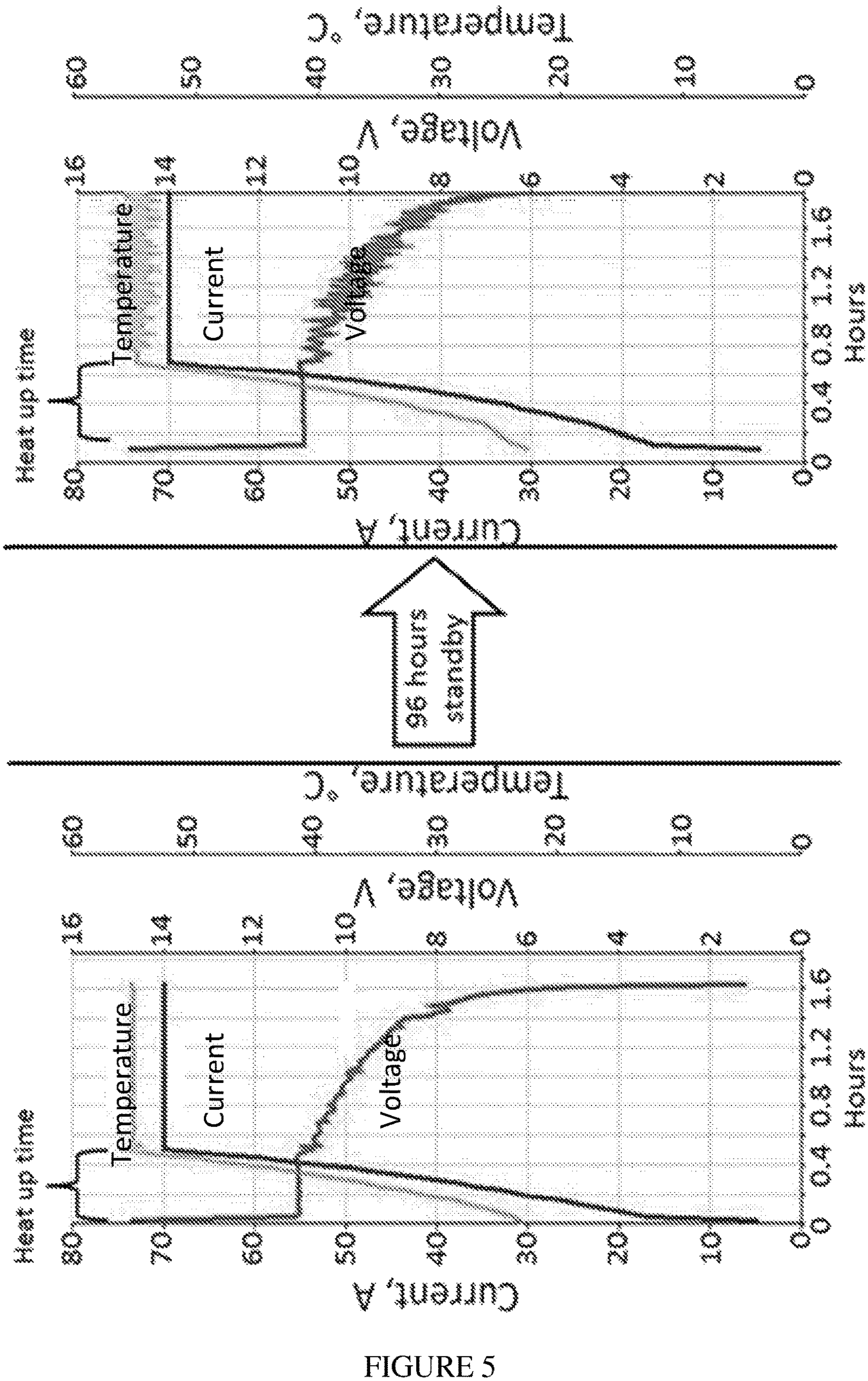
FIG. 5 shows voltage, current and electrolyte temperature graphs of two operation cycles of aluminum-air battery with phosphoric acid solution aerosol shut down and 96 hours standby: ease of restart and performance preservation.

FIG. 5 displays battery voltage and current, and electrolyte temperature during battery operation, before the shutdown/standby step (left graph) and after the shutdown/standby step (right graph).

Comparing the left and right graphs in FIG. 5, one can see that the applied shutdown procedure provided proper conservation of the battery, ease of restart, no damage or performance degradation, or any substantial change in heat-up duration occurred during 96 hours of standby.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus for treating an electrode of a metal-air battery at shutdown/standby mode, the apparatus comprising:

a metal-air battery comprising a metal anode;

an electrolyte tank fluidly connected to the metal-air battery such that electrolyte can be stored in the electrolyte tank during a shutdown/standby mode;

a liquid treatment tank fluidly connected to the metal-air battery through a pathway;

an aerosol generation element configured to generate aerosol; and an aerosol propulsion system configured to propel aerosol generated by the aerosol generation element into the metal-air battery by way of the pathway.

2. The apparatus of claim 1, wherein said pathway comprises a valve.

3. The apparatus of claim 2, wherein said valve is automatically controlled.

4. The apparatus of claim 2, wherein upon shutdown, said valve is opened thus extracting aerosol out of the liquid treatment tank.

5. The apparatus of claim 1, wherein said liquid treatment tank comprises an acid.

6. The apparatus of claim 5, wherein said acid is in the form of a liquid, a solution or a combination thereof.

7. The apparatus of claim 5, wherein said acid comprises an inorganic acid and wherein said inorganic acid comprises nitric, hydrochloric, hydrobromic, phosphoric, sulfuric, boric, hexafluorophosphoric acid or combination thereof.

8. The apparatus of claim 5, wherein said acid comprises an organic acid and wherein said organic acid comprises formic, acetic, citric, propionic, oxalic, adipic, sebacic, toluenesulfonic, gluconic, ascorbic, tartaric acid or combination thereof.

9. The apparatus of claim 1, wherein said liquid treatment tank further comprises gas.

10. The apparatus of claim 9, wherein said gas is used for generating an aerosol from the liquid in said liquid treatment tank.

11. The apparatus of claim 9, wherein said gas is used as a propellant for a liquid contained in said liquid treatment tank.

12. The apparatus of claim 9, wherein said gas comprises air, oxygen, nitrogen, $CO_2$, Ar, Ne, He or a combination thereof.

13. The apparatus of claim 1, wherein said anode is an alkaline metal-air battery anode.

14. The apparatus of claim 13, wherein said anode comprises one of zinc, magnesium, aluminum, lithium, aluminum-lithium, an alloy of these metals, or mixtures thereof.

15. The apparatus of claim 1, wherein during battery operation said battery comprises liquid electrolyte such that said anode is placed within said liquid electrolyte, and wherein said aerosol propulsion system is connected to said battery.

16. The apparatus of claim 1, wherein said pathway between the battery and the liquid treatment tank comprises a hose, a tube, a pipe, a pump, a piston, a motor, or a combination thereof.

17. The apparatus of claim 1, wherein upon shutdown, liquid electrolyte is drained from said battery and an aerosol is introduced into said battery using said aerosol propulsion system.

18. The apparatus of claim 1, wherein said aerosol is generated using liquid from said liquid treatment tank and using said aerosol propulsion system.

19. An electric vehicle comprising the apparatus of claim 1, wherein energy from said battery is used to propel said vehicle, and wherein said apparatus is activated during battery shutdown/standby mode.

20. A method for treating an electrode of a metal-air battery operated in a liquid electrolyte during a shutdown/standby mode, wherein the method is performed using the apparatus for treating an electrode of a metal-air battery recited in claim 1, said method comprises:

separating said electrode from a bulk of said liquid electrolyte; and bringing said electrode into contact with an aerosol by having the aerosol propulsion system propel aerosol through the pathway connecting the liquid treatment tank to the battery.

21. The method of claim 20, wherein said aerosol reacts with liquid electrolyte residue on and within said electrode.

22. The method of claim 21, wherein said reaction neutralizes said liquid electrolyte residue such that it does not further react with said electrode.

23. The method of claim 20, wherein said electrode is a metal anode and said liquid electrolyte is an alkaline liquid electrolyte.

24. The method of claim 20, wherein said aerosol comprises liquid droplets and a gas propellant.

25. The method of claim 24, wherein said aerosol liquid droplets are acidic in terms of pH.

26. The method of claim 20, wherein said aerosol is generated using the aerosol generation element.

27. The method of claim 26, wherein said aerosol generation element comprises an ultrasonic wave generator or a cylinder comprising liquid and compressed gas.

28. The method of claim 20, wherein prior to said separating step, said liquid electrolyte is contained in said battery and wherein said electrode is immersed in said liquid electrolyte.

29. The method of claim 20, wherein said separating step comprises draining or pumping said liquid electrolyte form said battery into the electrolyte tank.

30. The method of claim 29, wherein said separating step comprises draining or pumping said liquid electrolyte by blowing air into a battery inlet and allowing the liquid to drain through a battery outlet.

31. The method of claim 20, wherein said step of bringing said electrode into contact with said aerosol comprises introducing or spraying said aerosol into said battery.

32. The method of claim 20, wherein said electrode functions as the anode in a metal-air battery.

33. The method of claim 32, wherein said anode comprises zinc, magnesium, aluminum, lithium, aluminum-lithium, an alloy of these metals, or mixtures thereof.

* * * * *